United States Patent [19]
Wallace

[11] 4,165,684
[45] Aug. 28, 1979

[54] DEFROST AND COOKING APPARATUS

[75] Inventor: Cornelius J. Wallace, New York, N.Y.

[73] Assignee: S.E.N.O.C.T. Corp., Bronx, N.Y.

[21] Appl. No.: 872,175

[22] Filed: Jan. 25, 1978

Related U.S. Application Data

[63] Continuation-in-part of Ser. No. 683,737, May 6, 1976.

[51] Int. Cl.² ............................................. A47J 37/04
[52] U.S. Cl. .................................... 99/421 H; 99/448
[58] Field of Search ............ 99/421 R, 421 H, 421 M, 99/439, 440, 446, 448, 450, 443 C, 346; 220/20–22

[56] References Cited
U.S. PATENT DOCUMENTS

| | | | |
|---|---|---|---|
| 1,051,502 | 1/1913 | Klein | 99/421 H |
| 1,666,394 | 4/1928 | Miglin | 99/421 H |
| 1,899,335 | 2/1933 | Kastner | 99/427 X |
| 1,952,433 | 3/1934 | Halstead | 99/427 |
| 2,705,450 | 4/1955 | Steinbook | 99/340 |
| 3,614,924 | 10/1971 | Hickey | 99/448 X |

Primary Examiner—Leonard D. Christian
Attorney, Agent, or Firm—Auslander & Thomas

[57] ABSTRACT

A food defrost and cooking apparatus includes a drum and a stand. The drum's position may be freely changed on the stand to shift the food in the drum during defrosting and cooking, but motion of the drum is limited by a camming arrangement between the stand and drum and a stop. The drum is also optionally vertically supportable on the stand for convenient loading.

11 Claims, 6 Drawing Figures

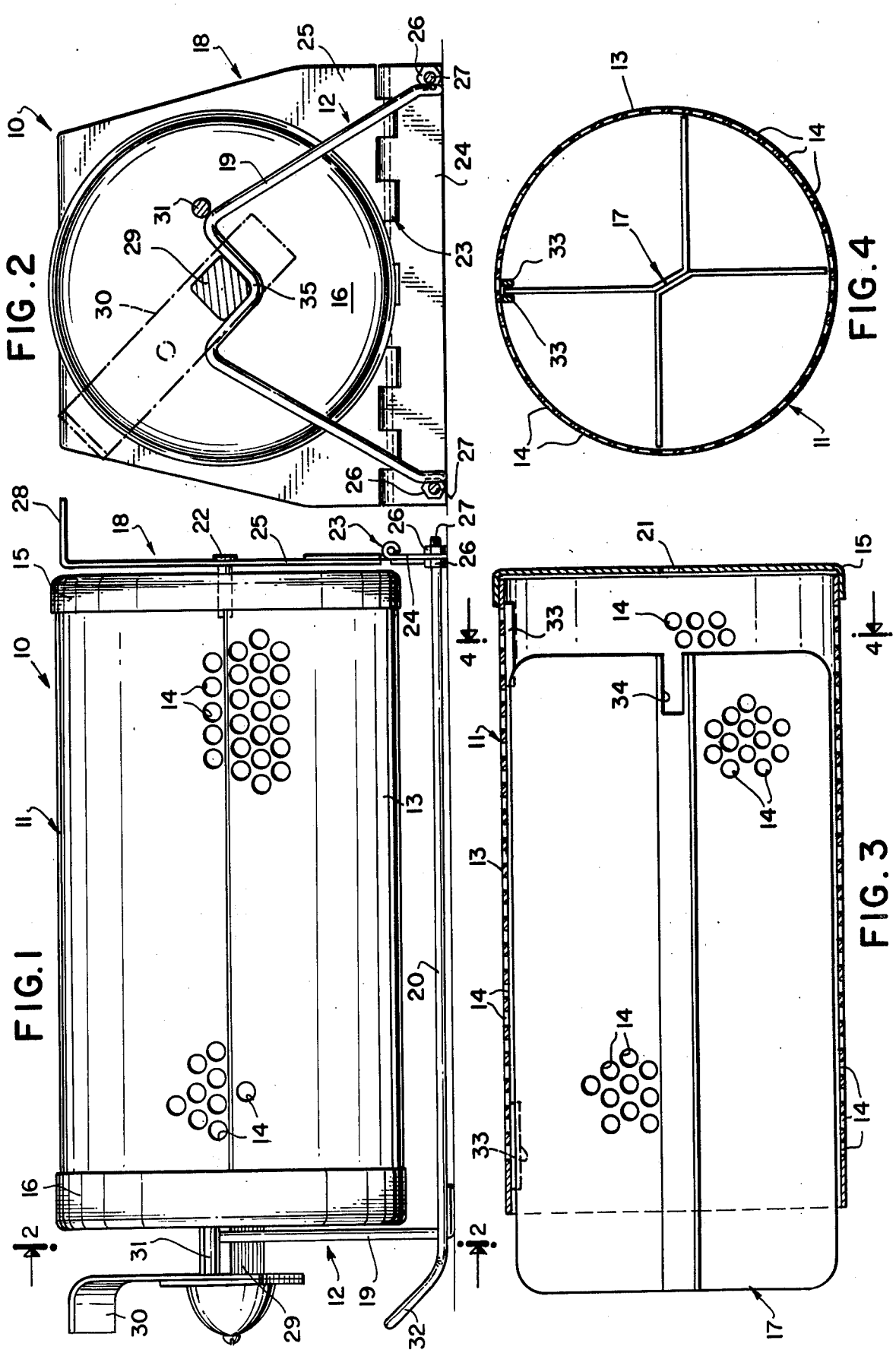

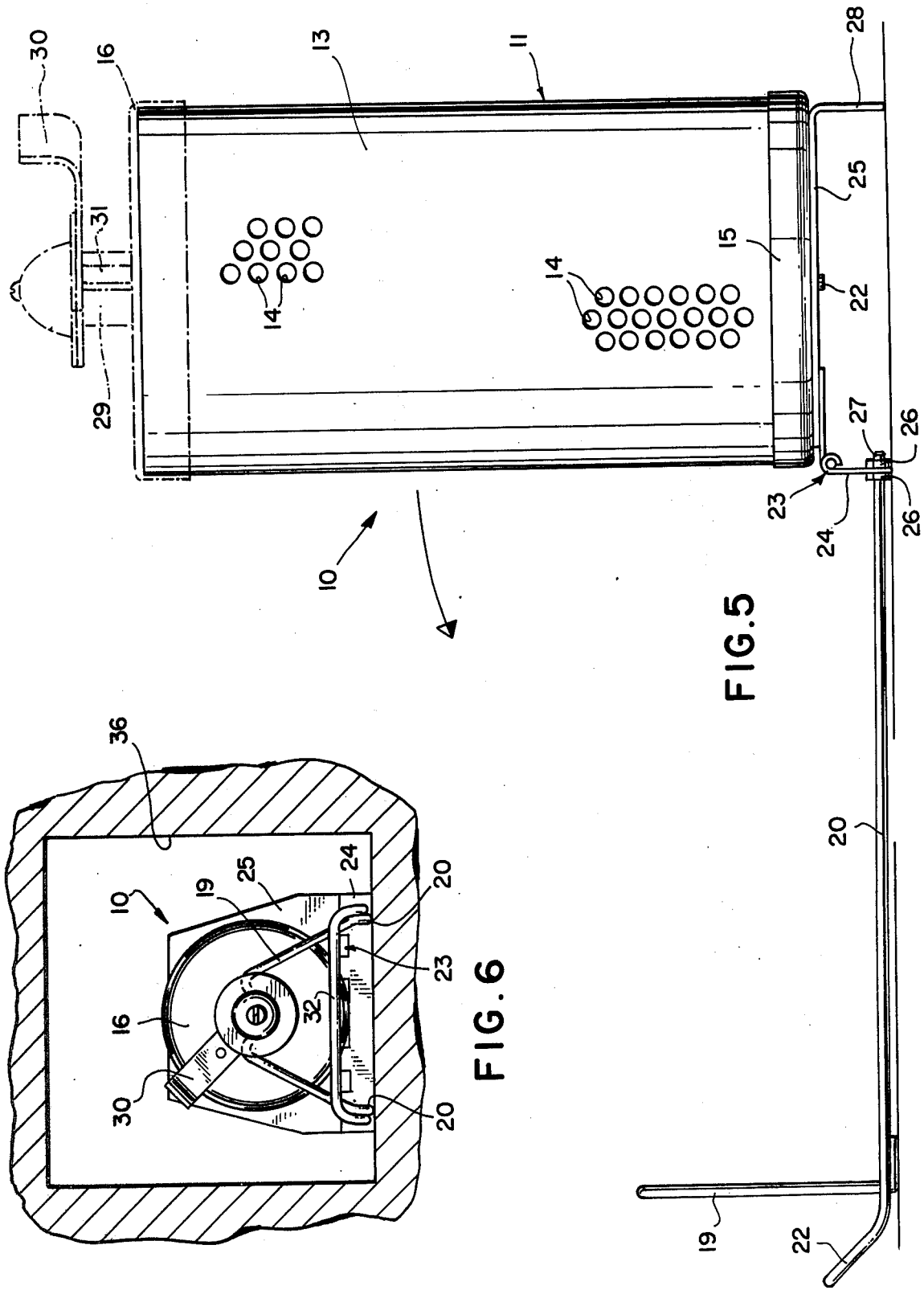

DEFROST AND COOKING APPARATUS

The present invention is a frozen food defrost and cooking apparatus and is a continuation in part of my application Ser. No. 683,737 filed May 6, 1976 in Art Unit 242 of the Patent and Trademark Office.

The present invention is devoted to the specific problem of providing a quick, effective and inexpensive way of defrosting and cooking frozen foods, particularly frozen foods such as french fries or solid-coated foods such as fish sticks.

A purpose of the present invention is to effect the defrost and cooking of such frozen foods both quickly so that the food can be available soon after it is desired.

In the past, preparation of frozen french fries for eating required either the quick heating of the frozen french fries in a high heat to defrost and cook the french fries to be firm and crisp. Mixing of the frozen food in a batch in a pan to obtain even heat distribution posed another problem. Oftentimes the frozen foods, such as french fries, even if evenly defrosted and cooked would be broken by the act of mixing.

An alternative method of the past of preparing french fries in particular, was to take the frozen french fries and deep fry them. While the method produced excellent french fries it required large amounts of expensive cooking oil.

According to the present invention, a specific apparatus is provided for quick and effective defrosting and cooking of frozen foods without mixing or the need for cooking oil, yet having fast and even heat distribution.

The defrost and cooking apparatus is intended to fit within an oven. It is compartmentalized for better distribution of food and may be used with combinations of frozen foods to be defrosted and cooked.

Although such novel feature or features believed to be characteristic of the invention are pointed out in the claims, the invention and the manner in which it may be carried out, may be further understood by reference to the description following and the accompanying drawings.

FIG. 1 is a front elevation of the defrost and cooking apparatus of the present invention.

FIG. 2 is a side section of FIG. 1 along lines 2—2.

FIG. 3 is a section of the apparatus drum showing the divider being removed.

FIG. 4 is a section of FIG. 3 along lines 4—4.

FIG. 5 is a front elevation of the drum on the stand in loading position.

FIG. 6 is a side elevation of the defrost and cooking apparatus of the present invention in an oven.

Referring now to the figures in greater detail, where like reference numbers denote like parts in the various figures.

The food defrost and cooking apparatus 10 comprising a basic drum 11 and a stand 12. The drum 11 includes a tube 13 having perforations 14, a first end cap 15 and a second end cap 16 with an internal divider 17 which is preferably removable. The stand 12 has a first drum support end 18 and a second drum support end 19 joined by a "U" shaped runner 20.

The first end cap 15 fits over the tube 13 and is preferably permanently affixed to the tube 13. The first end cap 15 includes an opening 21 which can receive a pin 22 in the first drum support end 18.

The drum support 18 includes a hinge 23 joining the lower portion 24 of the drum support end 18 with its upper portion 25. The lower portion 24 is fastened to the runner 20 by nuts 26 threaded to the ends 27 of the runner. The upper portion 24 has an "L" shaped portion 28.

The second end cap 16 of the drum 11 fits over the tube 13 and is held by friction in a press fit. The cap 16 includes a central square shaft 29. Mounted on the shaft 29 is a handle 30. The handle 30 is supported by a stop 31 spaced away from the shaft 29 and mounted between the handle 30 and the end cap 16.

The runner 20 has a turned-up end 32 which acts as a handle or gripper for the food defrost and cooking apparatus 10 and is usually used in conjunction with the "L" shaped portion 28 which acts as a second handle for conveying the defrost and cooking apparatus 10.

It is preferable for the divider 17 to have an openwork surface defined by perforation 14 and to be removable from the tube 13 as a convenience for cleaning. At least one set of guide means 33 is provided inside the tube 13 to guide the divider 17 in and out and to keep it in a selected position. The divider includes a notch 34 so that the divider 17 when in place, can fit over the pin 22.

In use, the drum 11 is preferably positioned upright by rotating the upper support 25 on the hinges 23 so that it rests on the "L" 28. The second end cap 16 is removed and selected quantities of frozen food to be defrosted and cooked are distributed in the compartment formed in the tube 13 by the divider 17. The second end cap 16 is replaced and the drum 11 set resting at one end on the second end 19 of the stand 12.

The second end 19 includes an upper "V" 35 which receives the square shaft 29 cradling it in position. The drum 11 is stopped against movement by the stop 31 resting against the side of the drum support 19. The defrost and cooking apparatus 10 is then grasped at the end of the runner 32 and at the "L" 28 and inserted into a preheated oven 36 as shown in FIG. 6, preferably with the handle 30 easily accessible.

The heat of the oven 36 circulates through the frozen food in the compartment formed by the divider 17. The divider 17 preferably includes perforation 14 to maximize circulation. After a while the handle 30 is rotated 180 degrees. The shaft 29 reengages itself in the "V" 35 and the stop 31 engages the drum end support 19 at its other side holding the drum 11 steady.

One or two rotations of the drum 11 are usually enough to redistribute the frozen food within the compartment formed by the divider 17 for fast and even defrosting and cooking and to provide even heat to the entire contents of the drum 11.

The compartments formed by the divider 17 may be used to separate different foods in the compartment to be defrosted and cooked at the same time, such as egg rolls, potato puffs or fish sticks, for instance.

Without a divider 17, no matter what is being defrosted and cooked, defrosting and cooking is not as good, since circulation of the heat through the perforations 14 reaches a larger amount of frozen products than would be available if everything were just placed into the drum 11 alone. There is less of a chance of clumping and the present invention, with its divider, nearly achieves the advantage of a rotating drum, which of course distributes the heat better. The present invention does the defrosting and cooking without the bruising of the frozen food that would take place by constangly rotating a drum.

After defrosting and cooking, the defrost and cooking apparatus 10 is removed from the oven 26, the end cap 16 removed and the cooked food served.

For cleaning, the drum 11 is lifted off the pin 22, the divider 17 removed and the entire defrost and cooking apparatus 10 is easily cleaned and readied for reuse.

The terms and expressions which are employed are used as terms of description. It is recognized, though, that various modifications are possible.

It is also understood the following claims are intended to cover all of the generic and specific features of the invention herein described, and all statements of the scope of the invention which, as a matter of language, might fall therebetween.

Having described certain forms of the invention in some detail, what is claimed is:

1. A food defrost and cooking apparatus for use in an oven comprising an openwork drum, said drum including a divider, said divider forming a plurality of compartments in said drum, removable closure means at one end of said drum, said closure means adapted to cover said compartments, a mounting stand, said drum including rotatably interengagable means on said mounting stand at one end, said other end of said drum freely interengagable with said mounting stand, said stand and drum at said other end including means to normally support the end of said drum in a selected position and against rotation.

2. The invention as claimed in claim 1 wherein said divider forms four substantially equal compartments in said drum.

3. The invention as claimed in claim 1 wherein said drum closure means is a press-fitting cap.

4. The invention as claimed in claim 1 wherein one drum end includes a shaft, said shaft supportably received on said stand.

5. The invention as claimed in claim 4 wherein said shaft includes a plurality of bearing surfaces, said bearing surfaces freely engagable with said stand.

6. The invention as claimed in claim 5 wherein said shaft is square.

7. The invention as claimed in claim 4 including a handle on said drum, said handle adapted to rotate said drum and said shaft.

8. The invention as claimed in claim 7 including rotation stop means between said drum and said stand.

9. The invention as claimed in claim 1 wherein said rotatable interengagement means of said drum and said stand includes a pin.

10. The invention as claimed in claim 9 wherein said pin extends from said stand to said drum.

11. The invention as claimed in claim 10 wherein said stand includes a hinged portion and said hinged portion includes a support, said hinged portion rotatable to vertically support said drum.

* * * * *